United States Patent Office 3,421,700
Patented Jan. 14, 1969

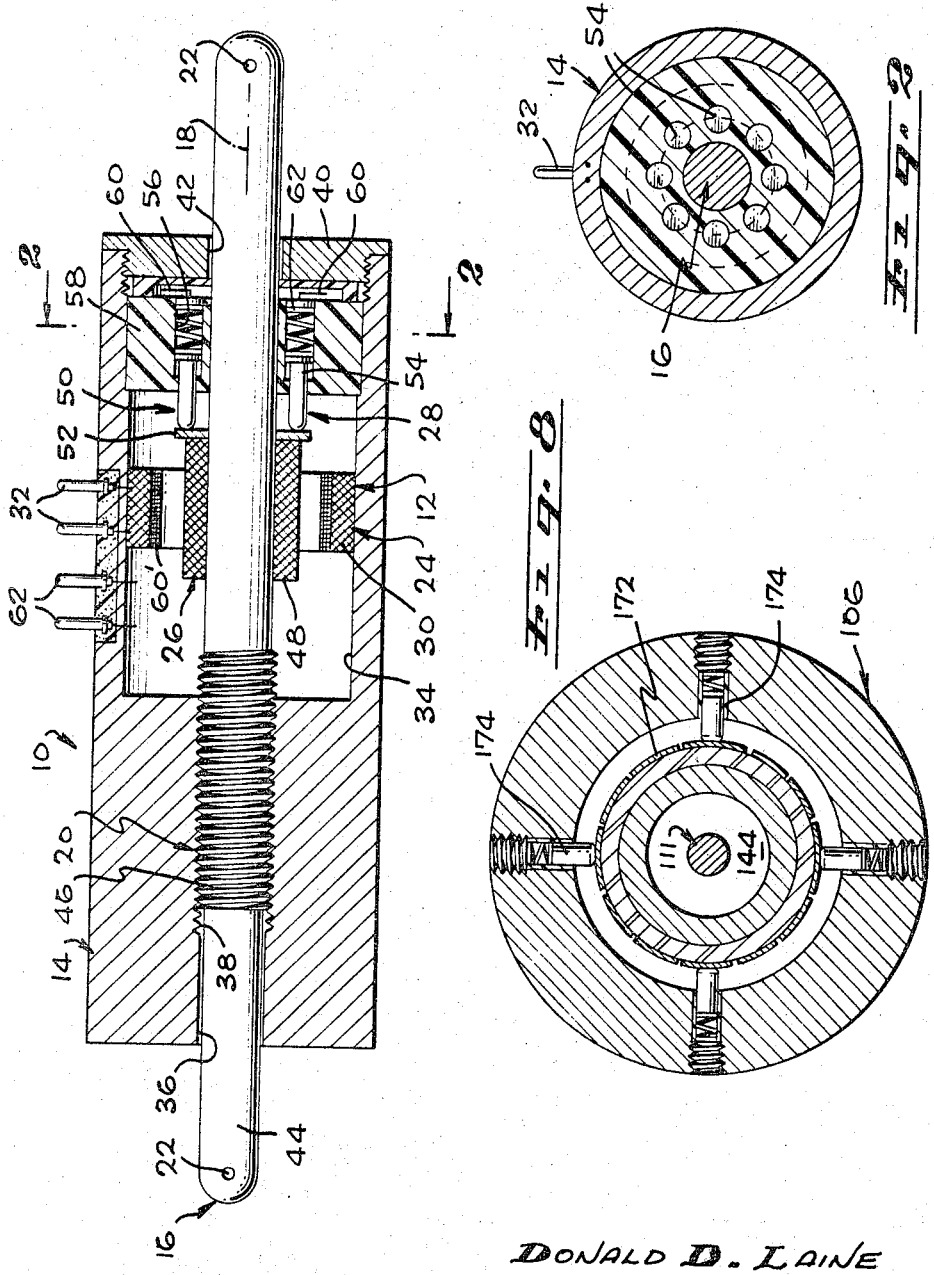

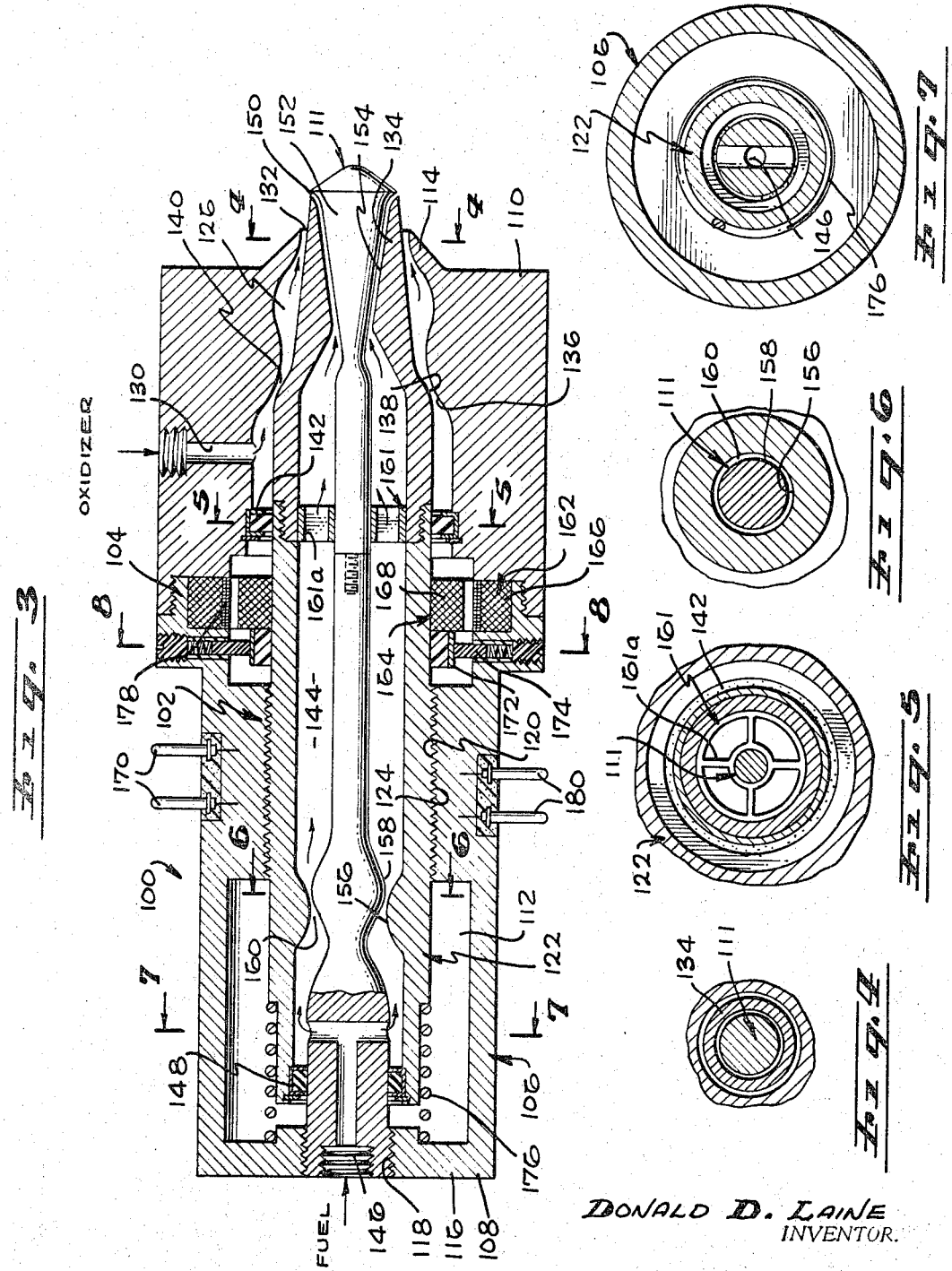

3,421,700
ELECTROMECHANICAL ACTUATOR
Robert C. Seamans, Jr., Deputy Administrator of the National Aeronautics and Space Administration with respect to an invention of Donald D. Laine, Torrance, Calif.
Filed Aug. 3, 1966, Ser. No. 570,097
U.S. Cl. 239—416         3 Claims
Int. Cl. B05b 7/12; B05b 15/08; F02g 3/00

ABSTRACT OF THE DISCLOSURE

This invention relates to an electromechanical linear actuator wherein the structure of a motor driven valve, having a body, including an outer generally tubular portion and an inner coaxial stem, and a tubular valve sleeve which surrounds the stem and is mounted within the tubular body portion for both rotation and axial translation relative to the valve body, constitutes a linear actuator, wherein the valve body and valve sleeve form the body and driven member respectively, of the actuator and the stator of the motor is fixed to the valve body and the rotor is fixed to the valve sleeve.

---

The invention described herein was made in the performance of work under a NASA contract and is subject to the provisions of Section 305 of the National Aeronautics and Space Act of 1958, Public Law 85–568 (72 Stat. 435; 42 USC 2457).

This invention relates generally to linear actuators. More particularly, the invention relates to a novel electromechanical linear actuator as well as to a unique electrical drive motor for the actuator and a valve assembly embodying the actuator.

In its broader aspects, the invention provides an electromechanical linear actuator including a body and a driven member supported on the body for rotation on a given axis and translation along this axis relative to the body. The body and driven member have coacting motion translation means for effecting movement of the driven member along its rotation axis in response to rotation of the driven member about this axis. The driven member is driven in rotation by an electrical drive motor according to the invention. This motor has a stator and a rotor which are fixed, respectively, to the body and driven member of the actuator. Accordingly, the rotor undergoes both rotation and axial translation with the driven member. To this end, the motor is uniquely constructed in accordance with the invention to accommodate both rotary and axial motion of the rotor relative to the stator.

As will appear from the ensuing description, both the actuator and the electrical motor of the invention are capable of many and varied applications. However, the invention will be described in connection with only one of these many applications. This disclosed application of the invention relates generally to controlling the thrust developed by a rocket engine and more specifically to a rocket thrust control valve for proportioning and metering the flow of fuel and oxidizer into the combustion chamber of a rocket engine for the purpose of effecting thrust control.

Among the various devices which have been devised to control or regulate the thrust developed by a rocket engine is a thrust control valve which is constructed to simultaneously meter and proportion flow of fuel and oxidizer into a rocket engine combustion chamber in such a way that both the relative proportions and the entrance velocities of the fuel and oxidizer entering the chamber remain substantially constant. This valve has a body, including an outer generally tubular portion and an inner coaxial stem, and a tubular valve member or sleeve which surrounds the stem and is mounted within the tubular body portion for both rotation and axial translation relative to the valve body. The valve body and valve sleeve are operatively coupled by motion translation means, such as inter-engaging threads on the body portion and sleeve, for causing axial translation of the valve sleeve in response to rotation of the sleeve. Thus, rotation of the valve sleeve through a given angle in either direction results in proportional axial movement of the sleeve in one direction or the other, depending upon the direction of rotation of the sleeve.

The valve sleeve and the tubular portion of the valve body define therebetween an oxidizer passage which opens through one end of the valve body. The valve sleeve and the inner valve stem define therebetween a fuel passage which also opens through the end of the valve body. The open ends of these passages define variable area, fuel and oxidizer injectors, respectively. Located within the fuel and oxidizer passages, between the respective injectors and passage inlets, are confronting formations on the valve sleeve, the tubular portion of the valve body, and the inner valve stem which define variable area fuel and oxidizer venturis. Axial movement of the valve sleeve relative to the valve body is effective to simultaneously vary the effective areas of the injectors and venturis, and hence the absolute flow rates of fuel and oxidizer through the valve, in such a way that the relative flow rates of the fuel and oxidizer and the exit velocities of the fuel and oxidizer emerging from the valve are maintained substantially constant.

In use, the valve is mounted on the wall of a rocket engine combustion chamber so as to inject fuel and oxidizer into the chamber. Regulation of the fuel and oxidizer flow rates in the manner just explained regulates the thrust developed by the rocket engine.

One important aspect of the present invention is concerned with utilizing an electrical torque motor of the invention for driving in rotation the valve sleeve of the thrust control valve, just described, to effect axial positioning of the sleeve relative to the valve body and thereby regulation of the flow rates of fuel and oxidizer through the valve. To this end, the stator of the motor is fixed to the valve body and the rotor is fixed to the valve sleeve. The rotor thus undergoes both rotation and axial translation with the valve sleeve and relative to the valve body and the motor stator. The torque motor is uniquely constructed in accordance with the invention to permit such relative axial movement of the rotor and stator.

As noted earlier, the motor is not limited to this particular valve application, or, for that matter, to use in valves. Thus, it is evident that the structure of the motor driven rocket engine thrust control valve, just described, exclusive of the fuel and oxidizer flow regulating features of the invention, constitutes a linear actuator, wherein the valve body and valve sleeve form the body and driven member, respectively, of the actuator. This basic actuator structure is obviously susceptible of utilization in any application which requires driving or positioning of an axially movable part.

A primary aspect of the invention is concerned with the construction of this actuator, and particularly its electrical drive or torque motor. Conceivably, the electrical motor of the invention may be of any basic electrical type. For example, the illustrative embodiments of the invention comprise D.C. motors including a rotor winding which is energized through a commutator on the rotor and commutator brushes on the stator. In one embodiment, the commutator is cylindrical in shape and is peripherally contacted by the commutator brushes. The commutator is axially dimensioned to permit substantial axial movement of the commutator relative to the brushes and the stator. A second embodiment employs a planar commutator disc mounted normal to the rotor axis and commutator brushes which contact one face of the disc and are yieldable axially of the rotor to permit axial movement of the rotor relative to the stator.

A general object of the invention, then, is to provide a novel electrical motor having a rotor which is capable of substantial axial movement relative to the stator.

A related object of the invention is to provide an electrical motor having a unique commutator and brush arrangement which accommodates axial movement of the rotor relative to the stator.

Another object of the invention is to provide a novel motor driven electromechanical linear actuator having a driven member which undergoes axial translation relative to the actuator body in response to rotation of the driven member, and wherein the rotor of the actuator motor moves axially with the driven member and relative to the motor stator.

A further object of the invention is to provide a valve, such as a rocket engine thrust control valve, having an axially movable valve member which is driven in rotation, and thereby axially positioned, by a torque motor according to the invention.

A still further object of the invention is to provide an electromechanical linear actuator of the character described, as well as an electrical drive or torque motor for the actuator and a valve embodying the actuator, which are relatively simple in construction and economical to manufacture, possess improved reliability, require minimum number of external seals, are compact and relatively lightweight, have optimum inertial characteristics permitting superior dynamic performance, enable precise positioning of the driven member of the actuator and of the flow controlling member of the valve, thus enabling precise mixture control in a rocket engine thrust control valve of the character described, and are otherwise ideally suited to their intended purposes.

Other objects, advantages, and features of the invention will become readily evident as the description proceeds.

With these and such other objects in view, the invention consists in the construction, arrangement and combination of the various parts of the invention, whereby the objects contemplated are obtained, as hereinafter set forth, pointed out in the appended claims, and illustrated in the accompanying drawings.

In these drawings:

FIGURE 1 is a longitudinal section through an electromechanical linear actuator according to the invention;

FIGURE 2 is a section taken on line 2—2 in FIGURE 1;

FIGURE 3 is a longitudinal section through a rocket engine thrust control valve according to the invention;

FIGURE 4 is a section taken on line 4—4 in FIGURE 3;

FIGURE 5 is a section taken on line 5—5 in FIGURE 3;

FIGURE 6 is a section taken on line 6—6 in FIGURE 3;

FIGURE 7 is a section taken on line 7—7 in FIGURE 3; and

FIGURE 8 is a section taken on line 8—8 in FIGURE 3.

Referring now to these drawings, particularly to FIGURES 1 and 2, there is illustrated an electromechanical linear actuator 10 embodying an electrical drive motor 12 according to the invention. Actuator 10 includes an outer housing or body 14 and an inner driven member 16 which is supported in the body for rotation about an axis 18 of the body and translation along the axis. The actuator body 14 and the driven member 16 have coacting motion translating means 20 for effecting linear movement or translation of the driven member along the axis 18 in response to rotation of the driven member about this axis. The ends of the driven member extend beyond the body and are provided with coupling means 22 for connecting the member to an external part to be driven or positioned by the actuator 10.

The motor 12 of the invention drives the member 16 in rotation and, thereby, also axially of the actuator body 14. This motor is a D.C. motor having a stator 24 fixed to the actuator body, a rotor 26 fixed to the driven member 16, and coacting electrical means 28 on the stator and rotor, including a winding 30 on the stator, for driving the rotor in rotation in response to energizing of the stator winding. The leads of the stator winding extend to a pair of externally accessible terminals 32 which are adapted for connection to an external electrical power supply for energizing the winding.

In operation of the electromechanical linear actuator 10, the motor 12 drives the driven member 16 in rotation in response to energizing of the stator winding 30 and in a direction determined by the direction of current flow through this winding. The coacting motion translating means 20 on the actuator body 14 and driven member 16 are effective to cause linear motion or translation of the driven member along its rotation axis 18 in response to rotation of the member about this axis. The direction of axial movement of the driven member is determined by the direction of its rotation. The rotor 26 of the actuator motor 12, being fixed, as it is, to the driven member 16, undergoes axial movement or translation with this member and relative to the actuator body 14 and the motor stator 24. As hereinafter explained, the coacting electrical means 28 on the stator and rotor are uniquely constructed in accordance with this invention to accommodate this axial movement of the rotor relative to the stator.

Referring now in greater detail to the actuator 10, the actuator body 14 is generally tubular in shape and has a central axis which coincides with the rotation axis 18 of the driven member 16. Extending into one end of the body, on the axis 18, is a relatively large diameter bore or chamber 34. Extending into the opposite end of the body, also on the axis 18, is a relatively small diameter bore 36, the inner end of which is threaded at 38 and opens to the body chamber 34. Threaded in the open end of this chamber is an end cap 40 having a central bore 42 on the axis 18. The driven member 16 comprises a cylindrical shaft 44, the ends of which extend through the body bore 36 and the end cap bore 42. The shaft is dimensioned to have a sliding fit within these bores. The driven shaft 44 is slightly enlarged and externally threaded intermediate its ends at 46. The body threads 38 and the shaft threads 46 interengage to define the motion translating means 20 for effecting axial movement of the driven member 16 in response to rotation of this member. The illustrated coupling means 22 on the driven member comprise bores which extend through the external ends of the member for receiving coupling pins, or the like, on the external part to be driven.

The stator 24 of the motor 12 is coaxially disposed within and fixed to the cylindrical wall of the body chamber 34, intermediate the ends of this chamber. The rotor 26 of the motor surrounds and is fixed to the adjacent end of the shaft 44 of the driven member 16 and is coaxially disposed within the stator 24. As indicated earlier, the motor 12 may be of any basic electrical type. The illustrated motor is a D.C. motor. The coacting electrical means 28 for electrically driving the rotor 26 in response to energizing of the stator winding 30 comprise, in addition to this winding, a winding 48 on the rotor and commutation means 50, including a commutator 52 on the rotor and commutator brushes 54 on the stator, for conducting energizing current between the rotor winding 48 and the motor terminals 32.

In the particular motor 12 under discussion, the commutator 52 has a disc shape and is coaxially fixed to one end of the rotor 26. The commutator, therefore, is disposed in a plane normal to the rotation axis 18 of the driven member 16. The commutator brushes 54 are slidably fitted in bores 56 which extend through a generally disc-shaped brush support 58, in spaced parallel relation to the rotation axis 18. The brush support 58 is constructed of electrical insulating material and is fixed within the actuator body chamber 34 adjacent the body end cap 40. Extending between the brushes 54 and the motor terminals 32 are electrical leads 60 which electrically connect the terminals and brushes. Positioned within the bores 56 in the commutator brush support 58 are springs 62 which resiliently urge the commutator brushes 54 into electrical contact with the commutator 52. The commutator has conducting sectors electrically connected to the rotor winding 48 in the well known way.

It is now evident that the actuator motor 12 is uniquely constructed to permit axial movement of its rotor 26 with the driven member 16 of the actuator 10 relative to the stator 24 of the motor. Thus, the commutator brushes 54 are yieldable axially of the rotor and thereby accommodate axial movement of the rotor while remaining in electrical contact with the commutator 52. It may be desirable to provide the stator winding 30 and the rotor winding 48 with different axial lengths, as shown, in order to assure efficient magnetic coupling of these windings in every axial position of the rotor. It is obvious at this point that the torque motor 12 is effective to drive the driven member 16 of the actuator 10 in rotation, and thereby also in axial translation, in response to connection of the motor terminals 32 to an electrical power supply.

Reference is now made to FIGURES 3-8 which illustrate a valve 100, specifically a rocket engine thrust control valve of the kind referred to earlier, embodying electromechanical linear actuating means 102 similar to that just described and including a torque motor 104 according to the invention. Valve 100 comprises a valve body 106 including a pair of outer, threadedly coupled, generally tubular body portions 108, 110 and an inner coaxial stem 111. Extending axially through the outer body portions 108, 110 is an opening 112. The front or right-hand end of this opening, as viewed in the drawings, opens through the front end face of the forward body portion 110 and is surrounded by a generally conical, axially projecting lip 114 on this body portion. The rear end of the body opening 112 is closed by a transverse end wall 116 on the rear body portion 108. End wall 116 has a central threaded opening 118 which receives the rear externally threaded end of the valve stem 111. The front end of this stem extends coaxially through and beyond the front, open end of the body opening 112. Intermediate the ends of the valve body 106, the body opening 112 is reduced in diameter and externally threaded at 120.

Valve 100 includes, in addition to the valve body 106, an inner coaxial valve member or sleeve 122. This valve sleeve extends through the body opening 112 in surrounding relation to the valve stem 111. Intermediate its ends, the valve sleeve 122 is externally threaded at 124 to mate with the body threads 120. These mating threads constitute motion translating means which are effective to cause axial movement or translation of the valve sleeve 122 in response to rotation of this sleeve.

The front tubular portion 110 of the valve body 106 and the front end of the valve sleeve 122 are radially spaced to define therebetween an annular fluid passage 126. In the particular rocket engine thrust control valve illustrated, this fluid passage conveys oxidizer and, for this reason, will be hereinafter referred to as an oxidizer passage. The rear end of the oxidizer passage communicates to an oxidizer inlet 130. The front end of the oxidizer passage 126 opens through the front end of the valve body 106 via an annular variable area oxidizer injector 132 which is defined between the front lip 114 on the valve body and the front tapered end 134 of the valve sleeve 122. Between the oxidizer inlet 130 and injector 132, the valve body 106 and the valve sleeve 122 have confronting, coaxial, internal and external convex shoulder formations 136, 138, respectively, which define therebetween an annular variable area oxidizer venturi 140 within the oxidizer passage 126. The rear end of the oxidizer passage is closed by a seal 142 carried by the valve body 106 and engaging the outer surface of the valve sleeve 122.

The inner valve stem 111 and the valve sleeve 122 are radially spaced to define therebetween an annular fluid passage 144. In the illustrated rocket engine thrust control valve, this passage conveys fuel. For this reason, the passage will be hereinafter referred to as a fuel passage. The rear end of the fuel passage 144 communicates to a fuel inlet 146 which opens axially through the rear end of the valve stem 111. The rear end of the valve sleeve 122 is sealed to the rear end of the valve stem by a seal 148. The front end of the fuel passage 144 opens through the front end of the valve body 106 via an annular, variable area fuel injector 150 which is defined between a front tapered end 152 on the valve stem 111 and the surrounding wall of a conical opening 154 in the front end of the valve sleeve. Between the fuel inlet 146 and the fuel injector 150, the valve stem 111 and the valve sleeve 122 have contronting, coaxial, external and internal convex shoulder formations 156 and 158, respectively, which define therebetween an annular, variable area fuel venturi 160 in the fuel passage 144.

Surrounding the valve stem 111, between the fuel injector 150 and the fuel venturi 160, is a bearing spider 161 which slidably supports the front end of the valve sleeve 122 on the valve stem. Extending through this spider are a number of ports 161a which permit fuel flow through the spider.

The structure, thus far described, of the rocket engine thrust control valve 100, is conventional. In use, the valve is mounted on the wall of the rocket engine combustion chamber in such a way that the oxidizer and fuel injectors 132, 150 open to the chamber. The oxidizer inlet 130 and fuel inlet 146 communicate to pressurize sources of oxidizer and fuel, respectively. The oxidizer and fuel from these sources flow through the oxidizer passage 126 and the fuel passage 144 into the combustion chamber wherein they combine and burn to produce thrust. The valve 100 is effective to meter and proportion oxidizer and fuel flow to the combustion chamber. Thus, it will be observed that forward axial movement of the valve sleeve 122 relative to the valve body 106 is effective to simultaneuosly reduce the cross sectional areas of both the oxidizer and fuel injectors 132, 150 and the oxidizer and fuel venturis 140, 160. Rearward movement of the valve sleeve relative to the valve body simultaneously increases the cross sectiontal areas of these injectors and venturis. Varying the effective areas of the venturis regulates the rates of fuel and oxidizer flow through the valve and hence the rates of fuel and oxidizer injection into the rocket engine combustion chamber. Regulation of these flow rates, in turn, varies engine thrust. The injector and venturi areas are varied in such a way as to maintain substantialy constant the relative flow rates of the oxidizer and fuel and the exit velocities of the oxidizer and fuel emerging from the valve through the injectors.

The present invention resides primarily in the arrangement of the torque motor 104 for driving the valve sleeve 122 in rotation and thereby axially positioning the valve sleeve relative to the valve body 106 to meter oxidizer and fuel in the manner just explained. Torque motor 104, like the motor in the linear actuator described earlier, comprises a stator 162 fixed to the valve body 106 and a rotor 164 fixed to the valve sleeve 122. The stator and rotor have windings 166 and 168, respectively. The leads of the stator winding 166 extend to a pair of terminals 170 which are adapted for electrical connection to an electrical power supply. The rotor winding 168 is electrically connected to the terminals 170 through a commutator 172 on the rotor and spring loaded commutator brushes 174 on the stator 162. The commutator 172 is cylindrical in shape and is coaxially mounted at one end of the rotor, as shown. The commutator brushes 174 are circumferentially spaced about the commutator in a plane normal to the rotor axis. The brushes are disposed in electrical contact with the commutator 172 and are electrically connected to the motor terminals 170.

Motor 104 is a so-called torque motor which is effective, when energized, to produce a torque on the rotor 164 for driving the latter, and hence the valve sleeve 122, in a direction to axially move the valve sleeve rearwardly in the valve body 106. Connected between the rear end of the valve sleeve and the valve body is a force balance torsion spring 176 which produces on the valve sleeve a torque in opposition to the torque produced by the torque motor 104.

It is now evident that the valve sleeve 122 may be axially positioned relative to the valve body 106, thus to regulate fuel and oxidizer flow through the valve, by regulating the voltage impressed on the terminals 170 of the torque motor 104. Increasing this voltage increases the motor torque on the valve sleeve and thereby effects rearward retraction of the valve sleeve relative to the valve body to increase the effective areas of the oxidizer and fuel injectors 132, 150 and the oxidizer and fuel venturis 140, 160, and thereby increase the rate of oxidizer and fuel flow through the valve. Reducing the impressed voltage results in forward axial movement of the valve sleeve relative to the valve body, under the action of the force balance spring 176, to reduce the effective injector and venturi areas, thus to reduce the oxidizer and fuel flow rates. As noted earlier, the relative flow rates and the exit velocities of the oxidizer and fuel remain substantially constant during this regulation of the absolute oxidizer and fuel flow rates.

It is obvious that during this operation of the valve 100, the rotor 164 of the torque motor 104 undergoes axial movement with the valve sleeve 122 and relative to the motor stator 162. The torque motor is uniquely constructed in accordance with this invention to permit such relative axial movement of the rotor and stator. Thus, the motor commutator 172 is axially dimensioned to accommodate the required axial movement of the commutator with the rotor 164 relative to the commutator brushes 174. Moreover, the commutator and brushes are arranged in such a way that the brushes are located midway between the ends of the commutator when the rotor and valve sleeve are located at the midpoint of their axial travel. Accordingly, the rotor can move in either axial direction from this mid position while the commutator brushes remain in electrical contact with the commutator to effect continued rotation of the rotor, and hence also the valve sleeve 122, during axial movement thereof between the limits of their axial travel. In this regard, it will be understood that the axial length of the commutator 172 is made sufficient to accommodate the required axial travel of the valve sleeve 122. If desirable or necessary, the stator 162 and rotor 164 of the torque motor 104 may be provided with different axial lengths to assure maximum torque on the rotor throughout the range of its axial travel.

In actual practice, it may be necessary to combine the valve 100 with a servomechanism which is effective to control the voltage impressed on the motor terminals 170 in such a way as to accomplish precise axial positioning of the valve sleeve 122. This servomechanism requires some means for sensing the axial position of the valve sleeve. This may be accomplished by providing the torque motor 104 with a feedback winding 178, the inductance of which varies in response to axial movement of the rotor 164 relative to the stator 162. The leads of this feedback winding extend to terminals 180 for connection to the servomechanism circuit. The actuator described earlier may also be equipped with such a feedback winding 60', the leads of which connect to terminals 62.

The electrical circuits of the motors embodied in the disclosed forms of the invention are conventional. Accordingly, it will be understood that the external terminals of the illustrated devices are electrically connected to the motor windings and brushes in the well known way. These terminals and the motor brushes are electrically insulated from the metallic parts of the devices, as shown in the drawings.

It is now obvious, therefore, that the invention herein described and illustrated is fully capable of attaining several objects and advantages preliminarily set forth.

While certain presently preferred embodiments of the invention have been disclosed for illustrative purposes, various modifications in the design, arrangement of parts and instrumentalities of the invention are possible within the spirit and scope of the following claims.

What is claimed as new in support of Letters Patent is:

1. A valve comprising:
   a valve body;
   a valve member supported within said body for rotation on an axis and translation along said axis relative to said body;
   coacting motion translating means on said valve member and body for effecting axial movement of said valve member along said axis relative to said valve body in response to rotation of said valve member;
   there being a fluid passage extending through said valve body;
   coacting flow regulating means on said valve body and valve member for regulating fluid flow through said passage in response to axial movement of said valve member relative to said valve body; and
   an electrical motor for driving said valve member in rotation including a stator fixed to said valve body, a rotor fixed to said valve member for rotation and axial movement with said valve member terminals on said valve body for connection to an electrical power supply, and coacting electrical means on said rotor and stator including a winding on said stator electrically connected to said terminals and adapted to be energized from said power supply for electrically driving said rotor and hence said valve member in rotation in response to energizing of said winding while permitting axial movement of said rotor with said valve member relative to said stator.

2. A rocket engine thrust control valve comprising:
   a valve body including an outer tubular portion and an inner stem extending coaxially through said tubular portion;
   a valve sleeve extending coaxially through said tubular body portion in surrounding relation to said stem;
   said valve sleeve being rotatable and axially movable relative to said valve body;
   coacting motion translating means on said valve sleeve and valve body for effecting axial movement of said valve sleeve relative to said valve body in response to rotation of said valve sleeve;
   said valve sleeve and valve body defining therebetween an annular oxidizer passage which communicates at one end to an oxidizer inlet in said valve body and opens at its opposite end through one end of said valve body via an annular variable area oxidizer injector defined between said one end of said valve body and the adjacent end of said valve sleeve;
   confronting formations on said valve body and valve sleeve defining a variable area oxidizer venturi in said passage between said inlet and injector;
   said valve sleeve and stem defining therebetween an annular fuel passage which communicates at one end to a fuel inlet in said valve body and opens at its opposite end through said end of said body via an annular variable area fuel injector defined between said one end of said valve sleeve and the adjacent end of said stem;

confronting formations on said valve sleeve and stem defining therebetween an annular variable area fuel venturi in said fuel passage between said fuel injector and fuel inlet;

axial movement of said valve sleeve relative to said valve body being effective to simultaneously vary the areas of said injectors and venturis in such manner as to maintain substantially constant the relative flow rates of oxidizer and fuel through said valve and the exit velocities of the oxidizer and fuel emerging from said valve through said injectors; and an electrical motor for driving said driven member in rotation including a stator fixed to said valve body, a rotor fixed to said valve sleeve for rotation and axial movement with said valve sleeve, terminals on said valve body for connection to an electrical power supply, and coacting electrical means on said rotor and stator including a winding on said stator electrically connected to said terminals and adapted to be energized from said power supply for electrically driving said rotor and hence said valve sleeve in rotation in response to energizing of said winding while permitting axial movement of said rotor with said valve sleeve relative to said stator.

3. A valve according to claim 2 wherein:

said motor is a torque motor which is effective to produce a torque in one direction on said valve sleeve;

a force balance spring operatively connected between said valve sleeve and valve body for producing an opposing torque on said valve sleeve; and said motor includes feedback means responsive to relative axial position of said rotor with respect to said stator for producing an output signal related to the axial position of said valve sleeve relative to said valve body.

References Cited

UNITED STATES PATENTS

| | | | |
|---|---|---|---|
| 1,008,866 | 11/1911 | Shaw | 239—416 |
| 2,212,052 | 8/1940 | Schultz | 239—416 |
| 2,814,929 | 12/1957 | Morley et al. | 60—258 |
| 3,074,231 | 1/1963 | Klein | 60—258 |
| 3,232,049 | 2/1966 | Rhodes | 239—416 |

EVERETT W. KIRBY, *Primary Examiner.*

U.S. Cl. X.R.

60—258, 39.74; 251—133; 239—585; 318—115; 310—17